(12) United States Patent
Fung et al.

(10) Patent No.: US 11,805,483 B2
(45) Date of Patent: Oct. 31, 2023

(54) METHOD AND APPARATUS FOR RESTORING WUP MODE FOR MULTI-SPEED ETHERNET DEVICE

(71) Applicant: Marvell Asia Pte, Ltd., Singapore (SG)

(72) Inventors: Hon Wai Fung, Newark, CA (US); Dance Wu, Palo Alto, CA (US); Liang Zhu, Shanghai (CN)

(73) Assignee: Marvell Asia Pte, Ltd., Singapore (SG)

( * ) Notice: Subject to any disclaimer, the term of this patent is extended or adjusted under 35 U.S.C. 154(b) by 27 days.

(21) Appl. No.: 17/644,139

(22) Filed: Dec. 14, 2021

(65) Prior Publication Data

US 2022/0191796 A1 Jun. 16, 2022

(30) Foreign Application Priority Data

Dec. 14, 2020 (CN) .......................... 202011475982.1

(51) Int. Cl.
*H04W 52/02* (2009.01)
*H04L 1/00* (2006.01)

(52) U.S. Cl.
CPC ....... *H04W 52/0232* (2013.01); *H04L 1/0025* (2013.01); *H04W 52/0274* (2013.01)

(58) Field of Classification Search
CPC .......... H04W 52/0232; H04W 52/0274; H04L 1/0025; H04L 1/0002; H04L 5/1438; Y02D 30/70

See application file for complete search history.

(56) References Cited

U.S. PATENT DOCUMENTS

| | | | |
|---|---|---|---|
| 2002/0003798 A1* | 1/2002 | Sato | H04L 1/0003 370/432 |
| 2009/0083402 A1* | 3/2009 | Jung | G06F 16/957 709/220 |
| 2009/0213830 A1* | 8/2009 | Duesberg | B82Y 10/00 340/572.1 |
| 2016/0182257 A1* | 6/2016 | Froelich | H04L 25/0262 375/229 |
| 2017/0181091 A1* | 6/2017 | Cao | H04W 8/04 |
| 2019/0238474 A1* | 8/2019 | Kadel | H04L 45/245 |
| 2020/0045635 A1* | 2/2020 | Lin | H04W 52/0248 |
| 2020/0106582 A1* | 4/2020 | Jalali | H04B 17/318 |
| 2020/0177522 A1* | 6/2020 | Lo | H04L 49/20 |

* cited by examiner

*Primary Examiner* — Christine Ng

(57) ABSTRACT

A method for waking up, from a low-power mode, a first communications node coupled to a second node via a first communication link, includes determining, while the first node is awake, a first transmission rate for transmitting data over the first link, storing the first rate at the second node, and selectively transmitting, from the second node to the first node, a first wake-up command at a symbol rate corresponding to the first rate. Where a third node is coupled to the second node via a second link, the method may further include determining, at the second node, while the third node is awake, a second transmission rate for transmitting data over the second link, storing the second rate at the second node, and selectively transmitting, from the second node to the third node, a second wake-up command at a symbol rate corresponding to the second rate.

20 Claims, 3 Drawing Sheets

METHOD AND APPARATUS FOR RESTORING WUP MODE FOR MULTI-SPEED ETHERNET DEVICE

FIELD OF USE

This disclosure is related generally to communication networks and, more particularly, to generation of wake-up commands.

BACKGROUND

Gigabit Ethernet is designed to transmit Ethernet frames at a rate of one gigabit per second (1 Gb/s). Gigabit Ethernet uses physical layer transceivers (PHYs) processing devices such as 1000BASE-T1, as defined by the Institute of Electrical and Electronics Engineers (802.3bp) Ethernet standard. A 1000BASE-T1 PHY supports full-duplex operation at 1 Gb/s over a single twisted copper wire pair. Similarly, 100BASE-T1 PHYs support full-duplex operation at 100 megabits per second (100 Mb/s). In some implementations, 1000BASE-T1 PHYs and 100BASE-T1 PHYs are called upon to operate in severely constrained environments, such as automotive and industrial environments in which certain requirements (e.g., electromagnetic compatibility and temperature requirements) must be met.

It is desirable for 100BASE-T1 PHYs and 1000BASE-T1 PHYs to enter a low-power mode to conserve power consumption and improve the overall efficiency of the automotive or industrial network. One approach to conserve power has been to keep these PHYs in the low-power mode and periodically waking up the PHY by sending a wake-up signal when the PHY is needed.

SUMMARY

In accordance with implementations of the subject matter of this disclosure, a method for waking up a communications node from a low-power mode, the communications node being a first node that is coupled to a second node via a first communication link, includes determining, while the first node is in an awake mode, a first data transmission rate for transmitting data over the first communication link connecting the first node and the second node, storing, at the second node, the first data transmission rate, and selectively transmitting, from the second node to the first node, a first wake-up command at a symbol rate corresponding to the stored first data transmission rate.

In a first implementation of such a method, the first data transmission rate may be determined prior to the first node transitioning to the low-power mode.

In a second implementation of such a method, a third node may be coupled to the second node via a second communication link, and the method may further include determining, at the second node, while the third node is in the awake mode, a second data transmission rate for transmitting data over the second communication link connecting the third node and the second node, storing, at the second node, the second data transmission rate, and selectively transmitting, from the second node to the third node, a second wake-up command at a symbol rate corresponding to the stored second data transmission rate.

According to a first aspect of the second implementation of such a method, the first data transmission rate may be different from the second data transmission rate.

A second aspect of the second implementation of such a method may further include determining the first data transmission rate and the second data transmission rate at a physical layer of the second node.

A third aspect of the second implementation of such a method may further include storing the first data transmission rate and the second data transmission rate at a physical layer of the second node.

According to a fourth aspect of the second implementation of such a method, waking up the first node may include waking up a 100BASE-T1 PHY device and waking up the third node may include waking up a 1000BASE-T1 PHY device.

In a third implementation of such a method, the first wake up command may be configured to transition the first node from the low-power mode to the awake mode.

In a fourth implementation of such a method, determining the first data transmission rate for transmitting data over the first communication link may include determining a transmission rate for a fixed communication link.

In a fifth implementation of such a method, storing, at the second node, the first data transmission rate may include storing the first data transmission rate such that the stored first data transmission rate is accessible from layer one without accessing higher network layers.

In accordance with implementations of the subject matter of this disclosure, a network controller includes control circuitry configured to determine, while a first node is in an awake mode, a first data transmission rate for transmitting data over a first communication link connecting a first node and the network interface device, and store, at the network transceiver, the first data transmission rate, and transceiver circuitry configured to selectively transmit, to the first node, at a symbol rate corresponding to the stored first data transmission rate, a first wake-up command designed to transition the first node from a low-power mode.

In a first implementation of such a network controller, the control circuitry may be configured to determine the first data transmission rate prior to the first node transitioning to the low-power mode.

In a second implementation of such a network controller, the control circuitry may be further configured to determine, while the first node is in the awake mode, a second data transmission rate for transmitting data over a second communication link connecting a second node and the network controller, and store, at the network controller, the second data transmission rate, and the transceiver circuitry may be further configured to selectively transmit, to the second node, at a symbol rate corresponding to the stored second data transmission rate, a second wake-up command designed to transition the second node from a low-power mode.

According to a first aspect of such a second implementation of a network controller, the first data transmission rate may be different from the second data transmission rate.

According to a second aspect of such a second implementation of a network controller, the control circuitry may be configured to determine the first data transmission rate and the second data transmission rate at a physical layer of the network controller.

According to a third aspect of such a second implementation of a network controller, the control circuitry may be configured to store the first data transmission rate and the second data transmission rate at a physical layer of the network controller.

According to a fourth aspect of such a second implementation of a network controller, the control circuitry may be configured to determine the first data transmission rate for transmitting data over the first communication link to the first node when the first node comprises a 100BASE-T1 PHY device and to determine the second data transmission rate for transmitting data over the second communication link to the second node when the second node comprises a 1000BASE-T1 PHY device.

In a third implementation of such a network controller, the control circuitry may be configured to selectively instruct the transceiver circuitry to transmit the first wake-up command as a command that is configured to transition the first node from the low-power mode to the awake mode.

In a fourth implementation of such a network controller, the control circuitry may be configured to determine the first data transmission rate for transmitting data over the first communication link to the first node when the first communication link is a fixed communication link.

In a fifth implementation of such a network controller, the control circuitry may be further configured to store, at the network controller, the first data transmission rate such that the stored first data transmission rate is accessible from layer one without accessing higher network layers.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
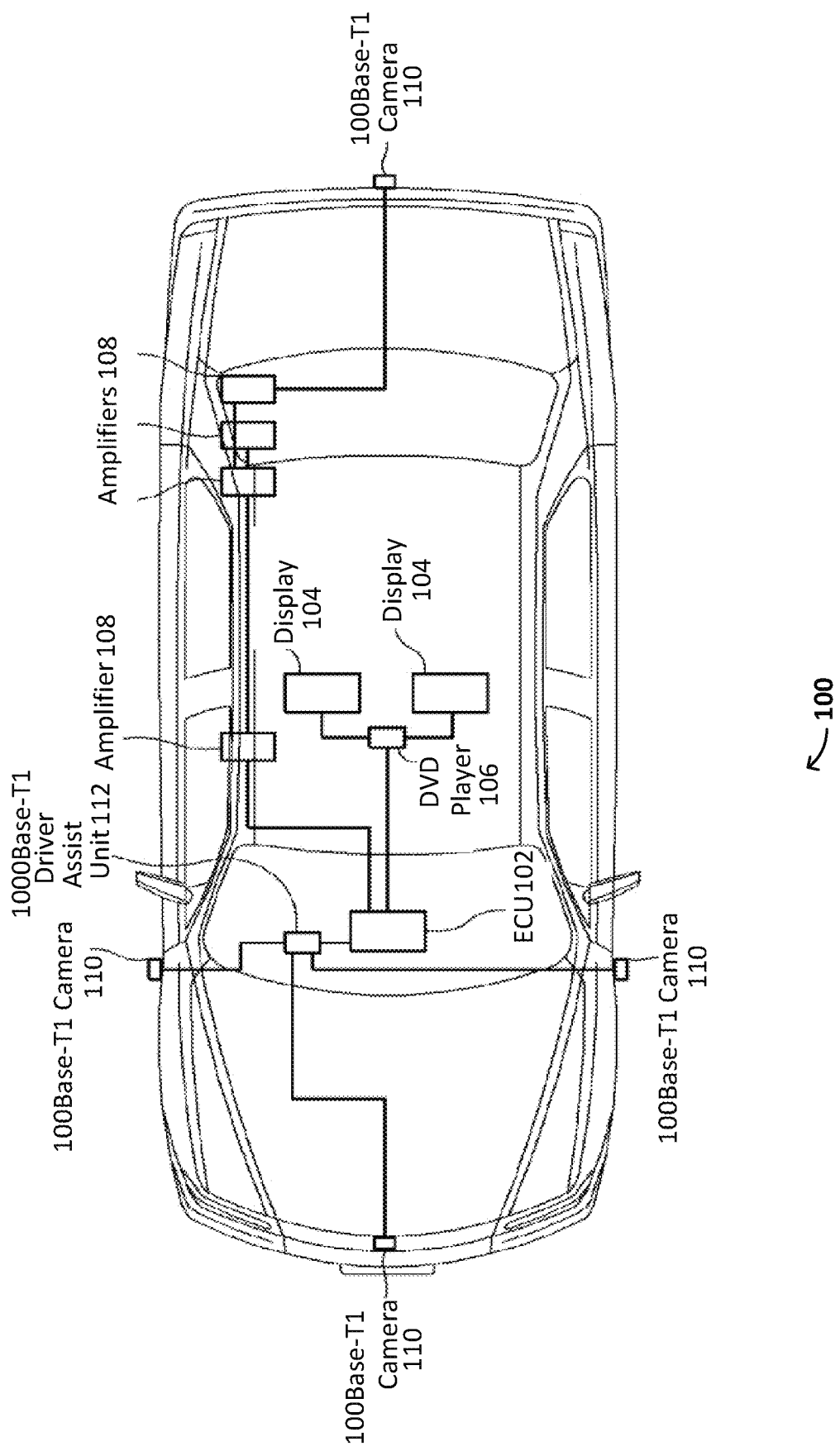
FIG. 1 is a block diagram illustrating an automotive environment having a number of 100BASE-T1 PHYs and 1000BASE-T1 PHYs which may incorporate implementations of the subject matter of this disclosure, according to some implementations described herein.

As noted above, gigabit Ethernet is designed to transmit Ethernet frames at a rate of one gigabit per second (1 Gb/s). Gigabit Ethernet uses physical layer processing devices (PHYs) such as 1000BASE-T1 devices, as defined by the Institute of Electrical and Electronics Engineers (802.3bp) Ethernet standard. A 1000BASE-T1 PHY supports full-duplex operation at 1 Gb/s over a single twisted copper wire pair. Similarly, 100BASE-T1 PHYs support full-duplex operation at 100 megabits per second (100 Mb/s). In some implementations, 1000BASE-T1 PHYs and 100BASE-T1 PHYs are called upon to operate in severely constrained environments, such as automotive and industrial environments, in which certain requirements (e.g., electromagnetic compatibility and temperature requirements) must be met.

It is desirable for 100BASE-T1 PHYs and 1000BASE-T1 PHYs to enter a low-power mode to conserve power consumption and improve the overall efficiency of the automotive or industrial network. One approach to conserve power has been to keep these PHYs in the low-power mode and periodically waking up the PHY by sending a wake-up signal when the PHY is needed.

However, waking up these PHYs presents a challenge in severely constrained environments, such as automotive and industrial environments. Specifically, when there are PHYs supporting different transmission rates (e.g., 1 Gb/s for 1000BASE-T1 PHYs and 100 Mb/s for 100BASE-T1 PHYs), the controller of the network must efficiently wake up these devices when they are needed. Additionally, when there is interference, such as in an automotive environment, it may be necessary to reduce the affective transmission rate relative to the nominal transmission speed rating. This reduced rate may be unknown and conventionally would require a time-consuming handshake procedure to determine the optimal speed at which the device can operate in the noisy environment. In many environments, such as automotive environments, it is important that devices are awakened from a low-power state as quickly as possible.

In the current specification of the automotive Ethernet Wake/Sleep function according to Technical Committee 10 (TC10) of the OPEN Alliance Special Interest Group, each different data transmission speed has its own wake-up (WUP) command (a pulse or series of pulses, or other suitable bit sequence, to be sent to wake up a link partner when the link partner is in sleep mode).

If auto-negotiation is not in use, and a PHY were to support both 100BASE-T1 and 1000BASE-T1 speeds, then typically the wake-up command used would be the wake-up command corresponding to the hardware-configured speed. However, if auto-negotiation is enabled, then when a multi-speed device (such as a controller) is partnered with a non-lowest speed device (e.g., a 1000BASE-T1 PHY), and the devices perform the sleep/wake-up function, the multi-speed device conventionally will use the WUP command for the lowest advertised speed (e.g., 100 Mb/s for a 100BASE-T1 PHY), which may not be a match for some link partners and might not be able to wake up those link partners.

Accordingly, there is a need for an efficient mechanism for waking up, from a respective low-power mode, PHYs having different transmission rates, particularly when auto-negotiation is in use.

In accordance with implementations of the of the subject matter of this disclosure, a controller (e.g., an Electronic Control Unit (ECU) as shown in FIG. 1) is configured to determine a first data transmission rate between the ECU and a first PHY. For instance, the data transmission rate may be determined during link training by transmitting one or more data packets over a fixed communication link connecting the two devices. Once the first data transmission rate is determined, the rate is stored at the physical layer of the controller. In some implementations, if the transmission rate changes during operation (e.g., because of changing conditions on the communication pathway), the stored first data transmission rate may be updated. Thereafter, when waking up the first PHY from a low-power mode, the controller retrieves the stored first data transmission rate, and transmits the wake-up command at a symbol rate corresponding to the first data transmission rate most recently used on the particular link.

The controller and the first PHY may be part of a larger system or network including additional PHYs that communicate with the controller. However, determination of the appropriate wake-up command is made separately for each individual PHY. The controller thus treats each PHY in the system or network individually, determining a respective data transmission rate for each of the PHYs within the network and separately storing the respective data transmission rates. If any individual PHY enters sleep mode and needs to be awakened, the controller may look up and use the respective data transmission rate to send an appropriate wake-up commands at a respective appropriate symbol rate corresponding to the respective data transmission rate.

Upon the initial power-up of any link, a preconfigured value that can be used to wake up the PHYs from a low-power mode is established through link training. Once the transmission link is up, the speed of the PHY when the link is established is stored at the physical layer of the ECU and is retained during both wake-up and sleep conditions by a multi-speed device (ECU). Afterwards, if the sleep/wake-up function is performed, when the multi-speed device is ready to wake the other PHYs within the network, the stored most recently wake-up speed of each previous link-up prior to sleep is used to determine the proper WUP mode to transmit. The WUP mode of the multi-speed device therefore ensures that the wake-up command will automatically be compatible for the link partner by using the previously stored data transmission rate. The possibility of WUP mode mismatch is reduced, and interoperability is enhanced.

In a possible alternative implementation, a new data transmission rate may be determined between a wake-up event and a sleep event if channel conditions degrade. In order to efficiently and rapidly wake up the sleeping link partner at the most recently used rate, that most recently used rate may be stored at the physical layer of the multi-speed device (ECU) prior to a device entering low-power mode. In such an alternative implementation the link partner would be programmed to accept different wake-up commands for different speeds, and the multi-speed device would issue the wake-up command corresponding to the most recently used speed. In this way, on a wake-up event, the link could be brought up at the correct speed in the first instance, rather than being brought up at the default speed of the link partner and having to be negotiated down to a lower speed based on conditions. This possible alternative implementation will be discussed in further detail below.

Figure 2:
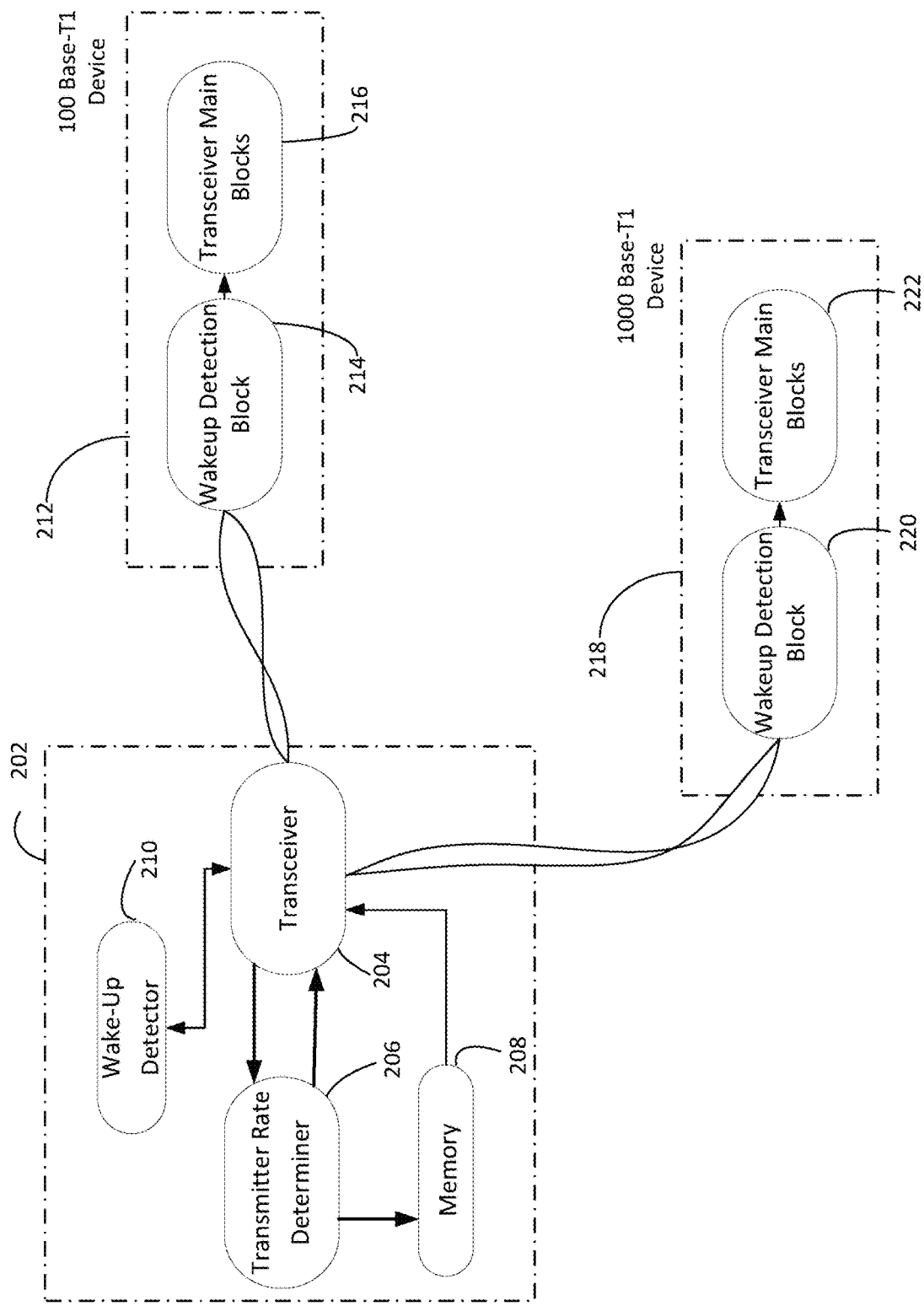
FIG. 2 illustrates a controller configured to wake up a first PHY and a second PHY operating at different transmission rates.
Figure 3:
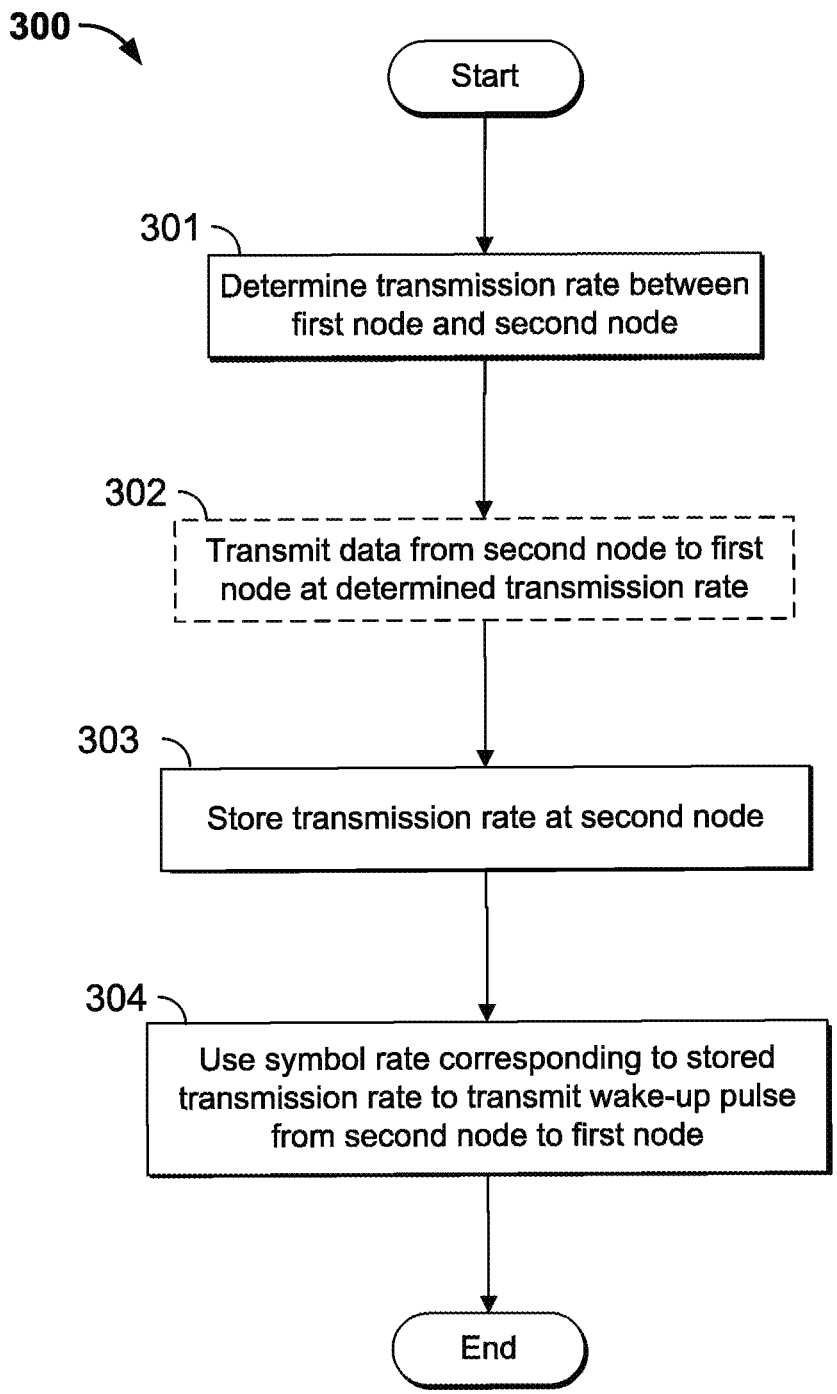
FIG. 3 is a flow diagram illustrating a method according to implementations of the subject matter of this disclosure.

The subject matter of this disclosure will be better understood by reference to FIGS. 1-3.

FIG. 1 is a block diagram illustrating an automotive environment having a number of 100BASE-T1 PHYs and 1000BASE-T1 PHYs which may incorporate implementations of the subject matter of this disclosure, according to some implementations described herein. In the example implementation shown in FIG. 1, the automotive network 100 includes an Electronic Control Unit (ECU) 102 (multi-speed device), 100BASE-T1 PHYs (displays 104, a DVD player 106, amplifiers 108, and cameras 110), and a 1000BASE-T1 PHY (Driver Assist Unit 112). Any number of 100BASE-T1 PHYs and 1000BASE-T1 PHYs can be included within the automotive network 100 of FIG. 1 in different implementations. Additional components of the multi-speed device, 100BASE-T1 PHYs, and 1000BASE-T1 PHYs are discussed in greater detail below in connection with FIG. 2.

In accordance with implementations of the subject matter of this disclosure, ECU 102, when communicating with the various 100BASE-T1 PHYs and 1000BASE-T1 PHYs, determines a respective data transmission rate for each of the PHYs and stores it—e.g., in a register—at the physical layer of ECU 102. For instance, ECU 102 stores a first data transmission rate corresponding to camera 110 while storing a second data transmission rate corresponding to Driver Assist Unit 112. In accordance with one implementation, the second data transmission rate is higher than the first data transmission rate.

When waking up cameras 110 from a low-power mode, ECU 102 generates a first wake-up command and transmits it to cameras 110 at a symbol rate corresponding to the first data transmission rate (e.g. 100 Mb/s). Similarly, when waking up Driver Assist Unit 112 from a low-power mode, ECU 102 generates a second wake-up command and transmits it to Driver Assist Unit 112 at a symbol rate corresponding to the second data transmission rate (e.g. 1000 Mb/s). In accordance with one implementation, ECU 102 determines and stores the respective data transmission rates prior to each of the PHYs transitioning to the low-power mode.

FIG. 2 is a high-level block diagram of two 1000BASE-T1 PHYs with which implementations of the subject matter of this disclosure may be used. As shown in FIG. 2, a multi-speed device 202 (e.g., ECU 102) includes a transceiver 204, a transmitter rate determiner 206, a memory 208, and a wake-up detector 210.

A first PHY 212 (e.g., each one of cameras 110) to be awakened includes a wakeup detection block 214 and transceiver main blocks 216. In accordance with an embodiment of the subject matter of this disclosure, PHY 202 is connected to PHY 212 by a single twisted pair of cables.

A second PHY 218 (e.g., Driver Assist unit 112) to be awakened includes a wakeup detection block 220 and transceiver main blocks 222. In accordance with an embodiment of the subject matter of this disclosure, PHY 202 is connected to PHY 218 by a single twisted pair of cables.

Upon an initial power-up event, ECU 202 has preconfigured data transmission rates corresponding to first PHY 212 and second PHY 218. ECU 102 begins transmitting data to first PHY 212 and second PHY 218 at their respective preconfigured values via transceiver 204. During an auto-negotiation process between ECU 202, first PHY 212, and second PHY 218, ECU 202, via transmitter rate determiner 206, determines a respective data transmission rates corresponding to each of the first PHY 212 and second PHY 218. The respective data transmission rates are then stored in memory 208 for subsequent use when waking up first PHY 212 and second PHY 218 from a low-power mode.

More specifically, when ECU 202 needs to wake up first PHY 212 and second PHY 218, transceiver 204 retrieves the stored respective data transmission rates corresponding to each of first PHY 212 and second PHY 218 from memory 208. Wake-up detector 210 generates a wake-up command and transceiver 204 transmits the wake-up command at a symbol rate corresponding to the respective data transmission rates to first PHY 212 and second PHY 218. In one implementation, transceiver 204 transmits the wake-up command to first PHY 212 (100BASE-T1 PHY) at a symbol rate of 66⅔ MHz per symbol. In addition, transceiver 204 transmits the wake-up command to second PHY 218 (1000BASE-T1 PHY) at a symbol rate of 62.5 MHz per symbol. The wakeup detection block 214 of first PHY 212, in response to receiving its respective wake-up command, begins the wake-up process via the transceiver main blocks 216. Similarly, wake-up detection block 220 of second PHY 218, in response to receiving its respective wake-up command, begins the wake-up process via the transceiver main blocks 222.

Transmission rates may deviate from the rated transmission rates. For example, transmission rates may become reduced because of interference affecting a link. Therefore, in the possible alternative implementation referred to above, the last transmission rate prior to a link partner entering a low-power mode is determined and stored in memory. In such an alternative implementation, each respective wake-up detection block 214, 220 would be programmed to accept different wake-up commands for different speeds, and the multi-speed device would issue the wake-up command corresponding to the most recently used speed. In this way, on a wake-up event, the link could be brought up at the correct speed in the first instance, rather than being brought up at the default speed of the link partner and having to be negotiated down to a lower speed based on conditions.

FIG. 3 is a flow diagram illustrating a method according to implementations of the subject matter of this disclosure for storing a symbol rate for waking up a device as described above.

At 301, a transmission rate between a first node and a second node is determined. Optionally at 302, data is transmitted from the second node to the first node at the determined transmission rate (although a method according to implementations of the subject matter of this disclosure can operate even if no actual data transmission occurs during a particular sleep/wake session). The transmission rate is stored at the second node at 303. At 304, the symbol rate corresponding to this stored transmission rate is used for transmitting a wake-up command from the second node to the first node.

Thus is it seen that a method for waking up devices in a wireline network, the devices having different respective operating speeds, has been provided.

While various embodiments of subject matter of the present disclosure have been shown and described herein, such embodiments are provided by way of example only. Numerous variations, changes, and substitutions relating to embodiments described herein are applicable without departing from the subject matter of the disclosure. It is noted that various alternatives to the embodiments of the subject matter of the disclosure described herein may be employed in practicing the subject matter of the disclosure. It is intended that the following claims define the scope of the subject matter of the disclosure and that methods and structures within the scope of these claims and their equivalents be covered thereby.

While operations are depicted in the drawings in a particular order, this is not to be construed as requiring that such operations be performed in the particular order shown or in sequential order, or that all illustrated operations be performed to achieve the desirable results.

The subject matter of this disclosure has been described in terms of particular aspects, but other aspects can be implemented and are within the scope of the following claims. For example, the actions recited in the claims can be performed in a different order and still achieve desirable results. In certain implementations, multitasking and parallel processing may be advantageous. Other variations are within the scope of the following claims.

What is claimed is:

1. A method for waking up a communications node from a low-power mode, the communications node being a first node that is coupled to a network controller via a first communication link, the method comprising:
   determining, while the first node is in an awake mode, a first data transmission rate for transmitting data over the first communication link connecting the first node and the network controller;
   storing, at the network controller, the first data transmission rate; and
   selectively transmitting, from the network controller to the first node, a first wake-up command at a symbol rate corresponding to the stored first data transmission rate.

2. The method for waking up a communications node according to claim 1, wherein the first data transmission rate is determined prior to the first node transitioning to the low-power mode.

3. The method for waking up a communications node according to claim 1, wherein a third node is coupled to the network controller via a second communication link, the method further comprising:
   determining, at the network controller, while the third node is in the awake mode, a second data transmission rate for transmitting data over the second communication link connecting the third node and the network controller;
   storing, at the network controller, the second data transmission rate; and
   selectively transmitting, from the network controller to the third node, a second wake-up command at a symbol rate corresponding to the stored second data transmission rate.

4. The method for waking up a communications node according to claim 3, wherein the first data transmission rate is different from the second data transmission rate.

5. The method for waking up a communications node according to claim 3, further comprising determining the first data transmission rate and the second data transmission rate at a physical layer of the network controller.

6. The method for waking up a communications node according to claim 3, further comprising storing the first data transmission rate and the second data transmission rate at a physical layer of the network controller.

7. The method for waking up a communications node according to claim 3, wherein waking up the first node comprises waking up a 100BASE-T1 PHY device and waking up the third node comprises waking up a 100BASE-T1 PHY device.

8. The method for waking up a communications node according to claim 1, wherein the first wake-up command is configured to transition the first node from the low-power mode to the awake mode.

9. The method for waking up a communications node according to claim 1, wherein determining the first data transmission rate for transmitting data over the first communication link comprises determining a transmission rate for a fixed communication link.

10. The method for waking up a communications node according to claim 1, wherein storing, at the network controller, the first data transmission rate comprises storing the first data transmission rate such that the stored first data transmission rate is accessible from layer one without accessing higher network layers.

11. A network controller comprising:
   control circuitry configured to:
      determine, while a first node is in an awake mode, a first data transmission rate for transmitting data over a first communication link connecting a first node and the network controller, and
      store, at the network controller, the first data transmission rate; and
   transceiver circuitry configured to:
      selectively transmit, to the first node, at a symbol rate corresponding to the stored first data transmission rate, a first wake-up command designed to transition the first node from a low-power mode.

12. The network controller according to claim 11, wherein the control circuitry is configured to determine the first data transmission rate prior to the first node transitioning to the low-power mode.

13. The network controller according to claim 11, wherein:
   the control circuitry is further configured to:

determine, while a second node is in the awake mode, a second data transmission rate for transmitting data over a second communication link connecting the second node and the network controller, and store, at the network controller, the second data transmission rate; and the transceiver circuitry is further configured to selectively transmit, to the second node, at a symbol rate corresponding to the stored second data transmission rate, a second wake-up command designed to transition the second node from a low-power mode.

14. The network controller according to claim 13, wherein the first data transmission rate is different from the second data transmission rate.

15. The network controller according to claim 13, wherein the control circuitry is configured to determine the first data transmission rate and the second data transmission rate at a physical layer of the network controller.

16. The network controller according to claim 13, wherein the control circuitry is configured to store the first data transmission rate and the second data transmission rate at a physical layer of the network controller.

17. The network controller according to claim 13, wherein the control circuitry is configured to determine the first data transmission rate for transmitting data over the first communication link to the first node when the first node comprises a 100BASE-T1 PHY device and to determine the second data transmission rate for transmitting data over the second communication link to the second node when the second node comprises a 1000BASE-T1 PHY device.

18. The network controller according to claim 11, wherein the control circuitry is configured to selectively instruct the transceiver circuitry to transmit the first wake-up command as a command that is configured to transition the first node from the low-power mode to the awake mode.

19. The network controller according to claim 11, wherein the control circuitry is configured to determine the first data transmission rate for transmitting data over the first communication link to the first node when the first communication link is a fixed communication link.

20. The network controller according to claim 11, wherein the control circuitry is further configured to store, at the network controller, the first data transmission rate such that the stored first data transmission rate is accessible from layer one without accessing higher network layers.

\* \* \* \* \*